United States Patent [19]

Derudder et al.

[11] Patent Number: 4,968,746
[45] Date of Patent: Nov. 6, 1990

[54] POLYESTERS MODIFIED WITH POLYORGANOSILOXANE/POLYVINYL-BASED GRAFT POLYMERS

[75] Inventors: James L. Derudder, Mt. Vernon, Ind.; I-Chung W. Wang, Williamstown, Mass.

[73] Assignee: General Electric Company, Pittsfield, Mass.

[21] Appl. No.: 271,896

[22] Filed: Nov. 14, 1988

[51] Int. Cl.$^5$ ............................................. C08L 51/08
[52] U.S. Cl. ................................. 525/63; 524/267; 524/262; 524/403; 524/439; 524/440; 524/425; 524/437; 524/449; 524/451; 524/404; 524/401
[58] Field of Search ............... 525/63; 524/267, 262, 524/403, 439, 440, 437, 425, 451, 449, 404, 401

[56] References Cited

U.S. PATENT DOCUMENTS

| | | | |
|---|---|---|---|
| 3,220,972 | 11/1965 | Lamoreaux | 260/46.5 |
| 3,775,452 | 11/1973 | Karstedt | 260/429 |
| 4,556,705 | 12/1985 | McCready | 528/289 |
| 4,806,593 | 2/1989 | Kress et al. | 525/63 |
| 4,812,515 | 3/1989 | Kress et al. | 525/63 |

FOREIGN PATENT DOCUMENTS

| | | | |
|---|---|---|---|
| 0231776 | 8/1987 | European Pat. Off. | 67/2 |
| 1590549 | 6/1981 | United Kingdom | 51/8 |

*Primary Examiner*—Melvin I. Marquis
*Attorney, Agent, or Firm*—Hedman, Gibson, Costigan & Hoare

[57] ABSTRACT

Thermoplastic molding compositions are provided which comprise a polyester resin alone or in combination with a poly(etherester) elastomer, a poly(etherimide ester) elastomer, or a mixture of the foregoing modified with a multi-stage polyorganosiloxane/polyvinyl-based graft polymer which exhibit materially enhanced impact strength, particularly at low temperatures, while maintaining other desirable properties without showing any tendency to delaminate. Particularly noteworthy are reductions in surface gloss and the substantially complete elimination of mottling.

36 Claims, No Drawings

POLYESTERS MODIFIED WITH POLYORGANOSILOXANE/POLYVINYL-BASED GRAFT POLYMERS

CROSS REFERENCE TO RELATED APPLICATIONS

This application is related to the following commonly owned, concurrently-filed U.S. patent applications:

| SERIAL NO. | SUBJECT MATTER | APPLICANT(S) |
|---|---|---|
| 07/271,250 | Polyorganosiloxane/polyvinyl-based Graft Polymers, Process and Thermoplastic Compositions Containing the Same | I-C. W. Wang |
| 07/271,223 | Thermoplastic Molding Compositions Containing Polyorganosiloxane/polyvinyl-based Graft Polymer Modifiers | J. L. DeRudder F. J. Traver I-C. W. Wang |
| 07/271,222 | Low Gloss Molded Articles Using Polyorganosiloxane/polyvinyl-based Graft Polymers | J. L. DeRudder H. Savenije I-C. W. Wang |
| 07/271,249 | Polyphenylene ether or Polyphenylene ether/Polystyrene with Polyorganosiloxane/polyvinyl-based Graft Polymer Modifiers | M. A. Alsamarraie W. R. Haaf W. J. Peascoe I-C. W. Wang |
| 07/271,248 | Polyorganosiloxane/polyvinyl-based Graft (meth)acrylate Polymers | M. A. Alsamarraie S. Y. Hobbs I-C. W. Wang V. H. Watkins |
| 07/271,247 | Polyester, Polycarbonate and/or Polyphenylene Ether with Polyorganosiloxane/polyvinyl-based Gaft (meth)acrylate Polymers | M. A. Alsammarraie S. Y. Hobbs I-C. W. Wang V. H. Watkins |
| 07/271,230 | Flame Retardant Polyorganosiloxane-based Graft Polymers | I-C. W. Wang |
| 07/271,246 | Polycarbonate and polyester Blends Modified with Polyorganosiloxane Graft Polymers Conbined with Diene Rubber-based Graft Polymers | J. L. DeRudder I-C. W. Wang |

FIELD OF THE INVENTION

The invention relates to thermoplastic molding compositions, comprising a thermoplastic polyester resin alone or in a mixture with a poly(etherester) elastomer, a poly(etherimide ester) elastomer or a mixture of the foregoing elastomers, or a blend of the foregoing and a polyorganosiloxane/polyvinyl-based graft polymer modifier which exhibit enhanced impact strength, particularly at low temperatures, while maintaining other desirable properties without showing any tendency to delaminate. Furthermore, parts molded from such compositions show a remarkable reduction of undesirable surface gloss and no surface mottling whatsoever.

BACKGROUND OF THE INVENTION

Thermoplastic polyester resin compositions and blends with thermoplastic polyester elastomers are widely used because of their excellent properties. Polyester resin compositions and mixtures thereof with a polyester elastomer are described in European Patent Application No. 0231776. It is disclosed therein that very desirable improvements in impact resistance, heat resistance, cold resistance and weather resistance are achieved if an additive comprising a silicone-based graft copolymer is used. In particular, a modifier comprising a silicone rubber is used onto which a styrene/acrylonitrile comonomer is grafted in the presence of a graft-linking agent. However, such modifiers have relatively poor rubber integrity and incompatibility with the resins, and this leads to delamination in molded articles. Also relevant is BASF, U.K. Patent Specification No. 1,590,549, especially Example 5, which describes a composition comprising 90 wt. percent of poly(butylene terephalate) and 10 wt. percent of a polyorganosiloxane graft polymer impact modifier. Molded articles made from such a composition will, like those of the EPO application above-mentioned, have numerous drawbacks, the most serious of which have been mentioned above, and they will also have a mottled surface appearance.

A novel polyorganosiloxane/polyvinyl-based graft polymer has now been discovered to be extremely useful as a modifier for such thermoplastic resins. It does not show any tendency to cause delamination, while at the same time providing remarkable improvements in tensile properties and impact performance and a reduction in surface gloss.

In the present invention, the polyorganosiloxane rubber substrate of the prior art is replaced by a co-homopolymerized network(s) of polyorganosiloxane/-polyvinyl-based polymer(s) in a co-homopolymerization process. Polyorganosiloxane/polystyrene-based co-homopolymers are particularly preferred for use in the first stage of the graft polymers used in the present invention. The present invention uses graft polymers provided by subsequent graft polymerization of vinyl monomers (e.g., polymethyl (meth)acrylate, polystyrene or styrene/acrylonitrile copolymer) onto the polyorganosiloxane/polyvinyl-based polymer product as described above.

This multi-stage graft polymer is usefully employed in the present invention as a superior impact strength modifier for thermoplastic molding compositions comprising polyesters and mixtures thereof with poly(ether-ester) elastomers, poly(etherimide ester) elastomers or a mixture of the foregoing. They maintain many unique features of silicone rubber such as enhanced impact strength, particularly at low temperature, while maintaining other desirable properties.

SUMMARY OF THE INVENTION

According to the present invention, there are provided thermoplastic molding compositions comprising a thermoplastic polyester resin (A); a mixture (A-1) comprising (i) a thermoplastic polyester resin and (ii) a poly(etherester) elastomer, a poly(etherimide ester) elastomer or a mixture of the foregoing or; a mixture (A-2) of (A) and (A-1); and an effective modifying amount of a multi-stage polyorganosiloxane/polyvinyl-based graft polymer composition (B) comprising: (a) as a first stage, a polymeric co-homopolymerized substrate comprised of, in combination, an organosiloxane polymer; at least one vinyl-based polymer; and optionally units derived from a cross-linking agent or agents, units which serve as a graft-linking agent or agents, units derived from a cross-linking agent or agents and units from the same or different agent or agents which serve as a graft-linking agent or agents, or a mixture of the foregoing units; and (b) at least one subsequent stage or stages graft polymerized in the presence of any previous stage(s) and which is comprised of a vinyl-based polymer or a cross-linked vinyl-based polymer.

Also contemplated by the invention are compositions as above defined wherein said subsequent stages comprise (b)(i) a second stage comprising at least one polymer which optionally includes units derived from a cross-linking agent or agents, units which serve as a graft-linking agent or agents, units derived from a cross-linking agent or agents and units from the same or different agent or agents which serve as a graft-linking agent or agents, or a mixture of any of the foregoing units; and (b)(ii) a third stage comprising at least one vinyl-based polymer or a cross-linked vinyl-based polymer which is the same as, or different than, said (b)(i) polymer.

DETAILED DESCRIPTION OF THE INVENTION

The thermoplastic polyester resin (A) or (i) in the present invention is derived from an aliphatic or cycloaliphatic diol, or mixtures thereof, containing from 2 to about 10 carbon atoms and at least one aromatic dicarboxylic acid. Preferred polyesters are derived from an aliphatic diol and an aromatic dicarboxylic acid have repeated units of the following general formula:

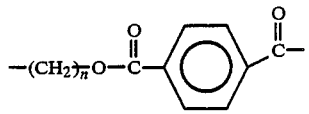

wherein n is an integer of from 2 to 4. The most preferred polyester is poly(ethylene terephthalate).

Also contemplated herein are the above polyesters with minor amounts, e.g., from 0.5 to about 2 percent by weight, of units derived from aliphatic acid and/or aliphatic polyols, to form copolyesters. The aliphatic polyols include glycols, such as poly(ethylene glycol). All such polyesters can be made following the teachings of, for example, U.S. Pat. Nos. 2,465,319 and 3,407,539.

The polyesters which are derived from a cycloaliphatic diol and an aromatic dicarboxylic acid are prepared, for example, by condensing either the cis- or trans-isomer (or mixtures thereof) of, for example, 1,4-cyclohexanedimethanol with an aromatic dicarboxylic acid so as to produce a polyester having recurring units of the following formula:

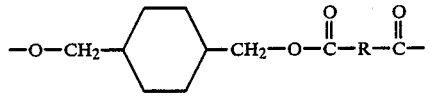

wherein the cyclohexane ring is selected from the cis- and trans-isomers thereof and R represents an aryl radical containing 6 to 20 carbon atoms and which is the decarboxylated residue derived from an aromatic dicarboxylic acid.

Examples of aromatic dicarboxylic acids represented by the decarboxylatd residue R are isophthalic or terephthalic acid, 1,2-di-(p-carboxyphenyl) ethane, 4,4'-dicarboxydiphenyl ether, etc., and mixtures of these.

All these acids contain at least one aromatic nucleus. Acids containing fused rings can also be present, such as in 1,4- or 1,5-napththalenedicarboxylic acids. The preferred dicarboxylic acids are terephthalic acid or a mixture of terephthalic and isophthalic acids.

Another preferred polyester may be derived from the reaction of either the cis- or trans-isomer (or a mixture thereof) of 1,4-cyclohexanedimethanol with a mixture of isophthalic and terephthalic acids. Such a polyester would have repeating units of the formula:

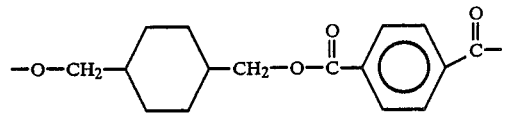

Still another preferred polyester is a copolyester derived from a cyclohexanedimethanol, an alkylene glycol and an aromatic dicarboxylic acid. These copolyesters are prepared by condensing either the cis- or trans-isomer (or mixtures thereof) of, for example, 1,4-cyclohexanedimethanol and an alkylene glycol with an aromatic dicarboxylic acid so as to produce a copolyester having units of the following formula:

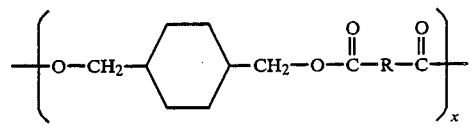

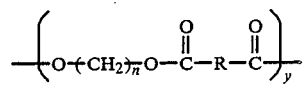

wherein the cyclohexane ring is selected from the cis- and trans-isomers thereof, R is as previously defined, n is an integer of 2 to 4, the x units comprise from about 10 to about 90 percent by weight and the y units comprise from about 90 to about 10 percent by weight.

Such a preferred copolyester may be derived from the reaction of either the cis- or trans-isomer (or mixtures thereof) of 1,4-cyclohexanedimethanol and ethylene glycol with terephthalic acid in a molar ratio of 1:2:3. These copolyesters have repeating units of the following formula:

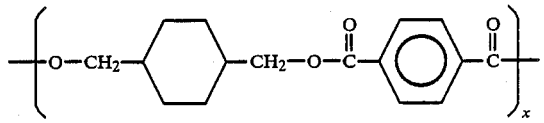

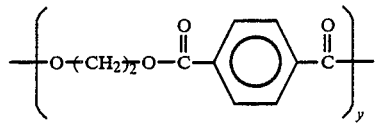

wherein x and y are as previously defined.

The polyesters described herein are either commercially available or can be produced by methods well known in the art, such as those set forth in, for example, U.S. Pat. No. 2,901,466.

The polyesters used herein have an intrinsic viscosity of from about 0.4 to about 2.0 dl/g as measured in a 60:40 phenol:tetrachloroethane mixture or similar solvent at 23°–30° C.

The poly(etherester) elastomer (ii) for use in the present invention is a block copolymer made by bonding a crystalline aromatic polyester, obtained by condensation of an aromatic dicarboxylic acid with an alkylene glycol, to an aliphatic polyester or polyether. Suitable crystalline aromatic polyesters for use herein include poly(ethylene terephthalate) and poly(1,4-butylene terephthalate). Suitable aliphatic polyesters include polylactone and polyadipate, e.g. a polyester resulting from the reaction of an aliphatic dicarboxylic acid of 2 to 12 carbon atoms with an aliphatic glycol of 2 to 10 carbon atoms, more specifically, polyethylene adipate, polytetramethylene adipate, polyethylene sebacate, polyneopentyl sebacate, polyhexamethylene azelate, or poly- -caprolactone and suitable polyethers including polyalkylene ether glycols, e.g. poly(ethylene oxide) glycol, poly(tetramethylene oxide) glycol, poly(propylene oxide) glycol, or a mixture thereof. A preferred thermoplastic poly(etherester) elastomer is a block copolymer constructed of poly(1,4-butylene terephthalate) serving as a hard segment component and polytetramethylene ether glycol serving as a soft segment component. While the copolymerization ratio of poly(1,4-butylene terephthalate) to polytetramethylene ether glycol can vary, the impact resistance increases with an increase in the content of polytetramethylene ether glycol.

The poly(etherimide ester) elastomers (ii) used herein may be prepared from one or more diols, one or more dicarboxylic acids and one or more high molecular weight polyoxyalkylene diimide diacids. Preparation of such materials is described in detail in U.S. Pat. No. 4,556,705 of R. J. McCready, issued Dec. 3, 1985.

The poly(etherimide ester) elastomer used herein may be prepared by conventional processes, such as esterification and condensation reactions for the production of polyesters, to provide random or block copolymers. Thus, poly(etherimide esters) may be generally characterized as the reaction product of the aforementioned diols and acids.

The multi-stage graft polymer of the present invention is made sequentially by a process which begins with a co-homopolymerization step.

Co-homopolymerization refers to a polymerization step where two distinct polymerization mechanisms are effected concurrently, including simultaneously. In particular, the first stage co-homopolymerization may encompass a siloxane polymerization (e.g. ring opening and condensation mechanism) in conjunction with a concurrent vinyl polymerization. The discrete mechanisms are not seen as competing with each other; rather, two homopolymers are concurrently produced, each retaining its own structure.

The co-homopolymerization process may provide two discrete networks rather than a random copolymer. While not intending to be bound by any theory, it is possible that the network(s) comprises two or more distinct interpenetrating polymer phases which provides the additional strength needed in the polyorganosiloxane phase. This is evidenced by the two distinct glass transition temperatures which can be detected by differential scanning calorimetry (DSC). Preferably, the product of the co-homopolymerization process is rubbery instead of a resin-like powder.

Subsequent to the co-homopolymerization of the siloxanes and vinyl-based monomers of the first step, at least one additional graft polymerization process is utilized to achieve the multi-stage polyorganosiloxane/polyvinyl-based graft polymers of the invention.

The subsequent graft polymerization is preferably of at least one vinyl type monomer. It has been found that a styrene/acrylonitrile copolymer, i.e. styrene/divinylbenzene copolymer, or an alkyl (meth)-acrylate is particularly effective as the second stage graft polymer or copolymer, or as the outermost stage when intermediary stages are optionally utilized.

The foregoing polyorganosiloxane/polyvinyl-based graft polymer can be isolated and utilized as, for example, an impact strength modifying agent for thermoplastic resins as will be discussed in detail below.

Additional cross-linking and/or graft-linking agent(s) can be utilized in this initial stage to provide co-homopolymerized networks from both polymeric constituents which provide greater rubber integrity.

The first stage rubbery substrate is provided by a series of sequential processing steps. In a premixing step, the ingredients required for the co-homopolymerization of the organosiloxane(s) and vinyl-based monomer(s) are premixed with water and suitable cross-linker(s), graft-linker(s), initiator(s) and surfactant(s). The premixed ingredients are homogenized by conventional means. The co-homopolymerization reactions may begin at this early stage of the process, but these reactions are generally slow at room temperature. The homogenized reactants may be directed to a reactor vessel, typically stainless steel or glass flasks under a nitrogen blanket. Heat is applied to facilitate the reaction. For typical 5 to 50 gallon stainless steel reactors, a 3 to 6 hour residence time at 75° C. to 90° C. is adequate to complete the co-homopolymerizations. Cooling for 2 to 6 hours will typically reduce the temperature to at least room temperature where the reaction mass can be held for 3 to 72 hours. Cooling to lower temperatures (e.g. 5° C.) may be sometimes preferred since this may enhance the properties of the formed polyorganosiloxane/polyvinyl substrate.

Cooling to room temperature or lower allows the polyorganosiloxane portion to build molecular weight, thereby minimizing the extractable silicone rubber fragments and optimizing physical properties of the product for certain applications. Generally, lower temperatures are preferred when it is desired to optimize the elasticity of the formed polyorganosiloxane/polyvinyl substrate.

The initiator for the siloxane component of the co-homopolymerization can be any ionic ring opening type initiator when cyclic siloxanes are utilized, such as alkylarylsulfonic acids, alkyldiaryldisulfonic acids, alkylsulfonic acids, or the like. The best suited example is dodecylbenzenesulfonic acid which can act as an initiator and at the same time as an emulsifier. In some cases, the joint use of a metal salt of an aforementioned sulfonic acid is also preferred.

The initiator for the styrenic or other vinyl monomers in the co-homopolymerization process can be any organic soluble radical initiator, such as azobisisobutyronitrile (AIBN) and the organic peroxides, e.g. benzoyl peroxide, dichloro benzoyl peroxide, or tertbutyl perbenzoate. Also suitable are water soluble radical initiators such as the persulfates. Although it is possible to charge this type of initiator at the beginning of the process, it is preferred that it be charged continuously or incrementally during the co-homopolymerization period. Since persulfate is less stable in the acid conditions of the siloxane polymerization, it is preferred that the persulfate be added over time to keep the vinyl polymerization running. Particle size, pH and total solids measurements can be readily monitored at this stage of the process. A latex rubber emulsion prepared as described above will generally contain particles having an average diameter of 100 to 800 nanometers and preferably 150 to 400 nanometers. The particle size is particularly influenced by the homogenization pressure (and the number of passes through the homogenizer) and the composition of the reaction ingredients. A pressure range of 2000 to 12000 psi is typical, and 3000 to 9000 psi is preferred. Multiple passes through the homogenizer may be preferred, but on a large scale a single pass may be most practical.

The foregoing reaction steps must be followed by a suitable neutralization process to provide the products of the invention. The main object of the neutralization is to quench the siloxane polymerization. This is accomplished by adding a caustic solution such as sodium hydroxide, potassium hydroxide, potassium or sodium carbonate, sodium hydrogen carbonate, triethanolamine or triethylamine. The pH of the reaction solution may be raised from a level of 1 to 3 to a pH of at least about 6.5, and preferably 7 to 9.

It is often desirable to add additional soap or surfactant to the emulsion formed at the end of the first stage, prior to the neutralization step. Additional surfactant tends to facilitate avoidance of premature agglomeration or flocculation of the co-homopolymerized rubber in the quench step.

The foregoing co-homopolymerization process provides a rubbery network composed of a polyorganosiloxane/polyvinyl substrate. This substrate is the first stage of the graft polymer of the present invention. The next stage involves the graft polymerization of additional vinyl-functional moieties onto graft sites provided by the rubbery substrate particles in the latex formed in the first stage. Subsequent additional stages are optional but may be preferred for certain applications.

The grafted polymers will preferably be the product of a vinyl polymerization process. Suitable vinyl monomers for graft polymerization include without limitation: alkenyl aromatic compounds such as styrene, divinylbenzene, alpha-methylstyrene, vinyl toluene, halogenated styrene and the like; methacrylates such as methyl methacrylate and 2-ethylhexyl methacrylate; acrylates such as acrylic acid, methyl acrylate, ethyl acrylate and butyl acrylate; vinyl cyanide compounds such as acrylonitrile and methacrylonitrile; olefins such as ethylene, propylene, butadiene, isoprene, and chloroprene; other vinyl compounds such as acrylamides, N-(mono or disubstituted alkyl)acrylamides, vinyl acetate, vinyl chloride, vinyl alkyl ethers, allyl (meth)acrylate, triallyl isocyanurate, ethylene dimethacrylate, diallyl maleate, maleic anhydride; maleimide compounds such as maleimide or N-phenyl (or alkyl)maleimide; and mixtures of these monomers.

The vinyl polymerization is accomplished in an emulsion; therefore, water soluble initiators are suitable, e.g., potassium persulfate, sodium persulfate and ammonium persulfate. It is practical to add the initiator at the beginning of this step, prior to charging the vinyl monomer for the second stage polymerization. Other Redox initiator systems, such as cumene hydroperoxide/ferrous sulfate/glucose/sodium pyrophosphate, can also be utilized at this stage as well as other organic peroxides.

Sequential multi-stage polymerization processes of this type are sometimes referred to as core-shell processes. It is preferred, however, to describe them as multi-stage graft polymerization processes wherein the initial stage provides a co-homopolymerized organosiloxane/vinyl-based substrate. This substrate may have sufficient grafting sites for a second or subsequent stage to be grafted thereto. Grafted polystyrene, poly (meth)acrylate, styrene/acrylonitrile copolymer or styrene/divinylbenzene copolymer as the outermost stage is preferred, yet many other intermediary stages such as a butyl acrylate stage are also contemplated. Furthermore, the grafting of additional stages of the same or different kinds is also possible.

In general, the first stage comprising the co-homopolymerized polyorganosiloxane/polyvinyl-based substrate will comprise approximately 5 to 95 weight percent of the total graft polymer based upon the weight of the first stage and the subsequent stage or stages taken together. Preferably, the first stage will comprise approximately 30 to 90 weight percent on the same basis. Correspondingly, the subsequent stages comprising the additional grafted vinyl polymer will comprise approximately 95 to 5 weight percent and preferably approximately 70 to 10 weight percent on the same basis. In the multi-stage systems, preferably, the ratio of first stage substrate polymer (B)(a) to second shell polymer (b)(i) is 10:90 to 90:10 and the amount of third shell polymer (b)(ii) comprises from about 10 to about 90 parts by weight per 100 parts by weight of (B)(a), (b)(i), and (b)(ii) combined.

The organosiloxanes useful in the first stage co-homopolymerization are any of those known to produce silicone elastomers and may include those which are hydroxy-, vinyl-, hydrideor mercapto-end capped linear organosiloxane oligomers.

The polyorganosiloxanes illustratively will be comprised primarily of units of the formula $R_n SiO_{(4-n)/2}$ wherein R is hydrogen or a monovalent hydrocarbon radical of about 1 to 16 carbon atoms and n is 0, 1 or 2.

Preferred among the organosiloxanes are those in cyclic form having three or more siloxane units, and most preferred are those having three to six units. Such organosiloxanes include without limitation, for example, hexamethylcyclotrisiloxane, octamethylcyclotetrasiloxane, decamethylcyclopentasiloxane, dodecamethylcyclohexasiloxane, trimethyltriphenylcyclotrisiloxane, tetramethyltetraphenylcyclotetrasiloxane, tetramethyltetravinylcyclotetrasiloxane and octaphenylcyclotetrasiloxane. These or similar organosiloxanes may be used alone or in combination.

The vinyl monomers useful in conjunction with the co-homopolymerization of organosiloxanes in the first stage are preferred to be alkenyl aromatic compounds such as styrene, divinylbenzene, alpha-methylstyrene, vinyl toluene, vinyl naphthalene, vinyl anthracene, and halogenated styrene or its derivatives. Other suitable vinyl monomers include acrylic acids and acrylates such as methyl-, ethyl-, allyl-, or butylacrylate; methacrylates such as methyl methacrylate or 2-ethylhexyl methacrylate; vinyl cyanides such as acrylonitrile or methacrylonitrile; olefins such as ethylene, propylene, butadiene, isoprene, chloroprene, and other vinyl compounds such as vinylimidazole, 5-vinyl-2-norbornene, vinyl pyridine, vinyl pyrrolidine, vinyl acetate, vinyl alkyl ethers, vinyl chloride, vinyl furan, N-vinyl carbazole, allyl (meth)acrylate, triallyl isocyanurate, ethylene di(meth)acrylate, butylene di(meth)acrylate, diallyl maleate, maleic anhydride; maleimide compositions such as maleimide or N-phenyl (or alkyl)maleimides; acrylamides; N-(mono or di-substituted) acrylamides; and mixtures of any of these monomers. In general, any rubbery or glassy vinyl type monomer may be used which can be mixable with the organosiloxanes. Typically, the vinyl component of the first stage co-homopolymer will be present in an amount of approximately 3 to 97 weight percent, and correspondingly, the organosiloxane component will be present in an amount of approximately 97 to 3 weight percent. Preferably, the vinyl component will comprise approximately 5 to 45 weight percent of the first stage of the co-homopolymerized substrate.

The cross-linker composition used in conjunction with the organosiloxane component of the present compositions can have the general formula

$$R^2{}_n-Si(OR^1)_{4-n}$$

wherein n is 0, 1, or 2, preferably 0 to 1 and each $R^1$ independently represents hydrogen or a monovalent hydrocarbon radical selected from among alkyl or aryl radicals having 1 to 16 carbon atoms, preferably methyl, ethyl and phenyl. $R^2$ can be the same as $R^1$ or can be a vinyl, alkenyl, thio, or (meth)acryloxyalkyl functional radical. When $R^2$ is a vinyl, alkenyl, thio, or acryloxyalkyl radical and n is 1, the cross-linker compound can also act as a graft-linker.

A preferred cross-linker compound is tetraethoxysilane. A combination cross-linking and graft-linking compound is vinyltriethoxysilane. Another suitable choice is gamma-methacryloxypropyltrimethoxysilane.

The multi-stage polyorganosiloxane/polyvinyl-based graft product of the present invention can be isolated by conventional means such as hot solution coagulation. For example, an electrolytic solution of about 0.5 to 5 percent aluminum sulfate or magnesium sulfate in water can be prepared and heated to about 75° to 95° C. When the latex is added, with agitation, the graft product will precipitate and can be held at elevated temperature for about 10 minutes whereupon it may be filter washed. Commercial latex isolation techniques such as spray dryers may also be utilized.

In a preferred feature of the invention, platinum or platinum compounds are utilized in conjunction with polyorganosiloxane compositions in order to enhance the flame retardance of the latter. As flame retarding additives, however, there may optionally be utilized the reaction product of chloroplatinic acid and organosilicon compounds as described in U.S. Pat. No. 3,220,972. Another platinum compound is seen in U.S. Pat. No. 3,775,452 describing platinum-containing organopolysiloxanes.

The compositions can also be further rendered more flame retardant with effective amounts, e.g., between about 1 and 30 parts by weight per 100 parts by weight of resin, of a flame retardant agent as component (C), e.g., elementary red phosphorous, phosphorous compounds, halogen compounds, nitrogen compounds, antimony oxide, zinc oxide, aluminum hydrate, mixtures thereof and the like.

In addition, reinforcing fillers as component (D); dyes and colored pigments; heat stabilizers; thermooxidative stabilizers and UV stabilizers; waxes, lubricants and processing assistants which ensure trouble-free extrusion and injection molding; and antistatic agents may be added to the molding compositions according to the invention.

Reinforcing filler (D) may be of various kinds and shapes including fibrous, spherical, flaky, and amorphous granular and powdery, natural or synthetic fillers, for example, glass fiber, carbon fiber, aramid fiber, metallic fiber, glass beads, glass flakes, calcium carbonate, talc, mica, aluminum oxide, magnesium hydroxide, boron nitride, beryllium oxide, calcium silicate, clay, and metal powders or whiskers. These reinforcing fillers (D) have the effect of reinforcing mechanical properties, especially rigidity, and heat resistance and may be used alone or in combination.

Conventional processes for mixing thermoplastic polymers can be used for the manufacture of molding compositions within the invention. For example, the compositions can be manufactured by using any suitable mixing equipment, e.g., cokneaders or extruders. The mixing temperatures are in general from 150° to 370° C., preferably from 200° to 345° C. The polymers are fused and thoroughly mixed, with or without the other additives described.

The addition of the graft polymers described above does not adversely influence the processing stability of the thermoplastically processable plastics material. The processing of the new molding compositions by extrusion or injection molding is preferably carried out at from 200° to 280° C., with the mold, in the latter case, being at from 40° to 130° C.

The amounts of components (A), (A-1) or (A-2) and (B) can vary broadly, but will usually be in the range of from about 1 to about 99 parts by weight of (A), (A-1) or (A-2) to from about 99 to about 1 part by weight of (B), per 100 parts by weight of (A), (A-1) or (A-2) and (B) together.

Where the composition comprises (A-1) or (A-2) and (B) combined, the amounts of (i) thermoplastic polyester resin and (ii) thermoplastic poly(etherester) elastomer, poly(etherimide ester) elastomer, or a mixture of the foregoing elastomers can vary broadly, but will usually be in the range from about 50 to about 9 parts by weight of (i) and from about 50 to about 1 part by weight of (ii).

DESCRIPTION OF THE PREFERRED EMBODIMENTS

The following examples illustrate the invention without limitation. All parts given are by weight unless otherwise indicated. Impact strengths are reported as notched Izod (NI) according to ASTM D-256 at 23° C. (r.t.) unless otherwise specified, and by Charpy NI by falling weight test. Tensile properties, i.e. tensile strength, tensile modulus and elongation, are measured by ASTM D-678 and surface gloss, 60°, by ASTM D-523.

A single slash is used between monomers of a single stage, and a double slash or a hyphen is used as a shorthand method of indicating separation between stages. The first stage to be polymerized is written before the double slash or hyphen, and subsequent stages are written subsequently.

PROCEDURE A

Octamethylcyclotetrasiloxane (D4), 90 parts, tetravinyltetramethylcyclotetrasiloxane (VMD4), 10 parts, tetraethoxysilane (TEOS), 1.7 parts, methacryloxypropyltrimethoxysilane (APTMOS), 1.43 parts, and 0.097 part of a platinum complex with chloroplatinum acid and containing 35,000 ppm platinum prepared in accordance with U.S. Pat. No. 3,220,972, are mixed together. A mixture of styrene(S), 33.3 parts, and divinylbenzene (DVB), 0.67 part, is thereafter added. The organic mixture is then added to deionized water, 400 parts, containing 1.33 parts dissolved dodecylbenzenesulfonic acid. The final stirred mixture is then homogenized twice at a pressure of 8000 psi. The crude emulsion is then polymerized at 75° C. for six hours using potassium persulfate 0.167 part as the initiator for styrenic polymerization. The silicone/polystyrene (Si/PS) first stage emulsion is cooled to room temperature overnight and is then quenched by neutralization from pH 1.7 to 8.1, following an optional addition of 0.67 parts of GAFAC® RE 610 surfactant which is predissolved in 6 parts of deionized water. The yield of the co-homopolymer is 87.3 percent, the mean particle diameter is 230 nm, the gel content is 78 percent and the degree of swelling is 13.6. A 75:25 weight ratio S/AN mixture is graft polymerized to the co-homopolymer for 6 hours at 75° C. using potassium persulfate as the initiator. The first stage/second stage weight ratio is 70:30, and the co-homopolymer graft efficiency is 60 percent.

PROCEDURE B 27 parts of 1,4-butanediol, 34 parts of dimethyl terephthalate and 39 parts of polyoxyalkylene diimide diacid prepared by the imidization of trimellitic anhydride and a propylene ether diamine are reacted to yield a poly(etherimide ester) copolymer.

EXAMPLE 1

A dry blend of 80 parts of polyester resin ((PBT), poly(1,4-butylene terephthalate), Valox® 315 General Electric Company), 20 parts of CSiM modifier ((Si/PS)-S/AN ratio of 70:30) prepared by the method of Procedure A, and 0.5 part of a stabilizer package is mixed, extruded, pelletized and molded. No mottling or delamination are seen. Izod bars are tested, and surface gloss is measured. Properties are summarized in Table 1.

EXAMPLE 2

A dry blend of 80 parts of polyester resin (Valox® 315), 10 parts of poly(etherimide ester) elastomer prepared by the method of Procedure B, 10 parts of CSiM modifier ((Si/PS)-S/AN wt. ratio of 70:30) prepared by the method of Procedure A, and 0.5 part of a stabilizer package is mixed, extruded, pelletized and molded. No mottling or delamination are seen. Izod bars are tested, and surface gloss is measured. Properties are summarized in Table 1.

COMPARATIVE EXAMPLE 2A*

A dry blend of 80 parts of polyester resin (Valox® 315), 20 parts of poly(etherimide ester) elastomer prepared by the method of Procedure B, and 0.5 part of a stabilizer package is mixed, extruded, pelletized and molded. Izod bars are tested, and surface gloss is measured. Properties are summarized in Table 1.

EXAMPLE 3

A dry blend of 70 parts of polyester resin (Valox® 315), 10 parts of poly(etherimide ester) elastomer prepared by the method of Procedure B, 20 parts of CSiM modifier ((Si/PS)-S/AN wt. ratio of 70:30) prepared by the method of Procedure A, and 0.5 part of a stabilizer package is mixed, extruded, pelletized and molded. No mottling or delamination are seen. Izod bars are tested, and surface gloss is measured. Properties are summarized in Table 1.

EXAMPLE 4

A dry blend of 70 parts of polyester resin (Valox® 315), 20 parts of poly(etherimide ester) elastomer prepared by the method of Procedure B, 10 parts of CSiM modifier ((Si/PS)-S/AN wt. ratio of 70:30) prepared by the method of Procedure A, and 0.5 part of stabilizer package is mixed, extruded, pelletized and molded. No mottling or delamination are seen. Izod bars are tested and surface gloss is measured. Properties are summarized in Table 1.

TABLE 1

Compositions Comprising Polyester and/or Poly(etherimide ester) Elastomer and CSiM

|  | 1 | 2 | 2A* | 3 | 4 |
|---|---|---|---|---|---|
| Polyester[A] | 80 | 80 | 80 | 70 | 70 |
| Poly(etherimide ester) Elastomer[B] | — | 10 | 20 | 10 | 20 |
| CSiM[C] | 20 | 10 | — | 20 | 10 |
| Stabilizers | 0.5 | 0.5 | 0.5 | 0.5 | 0.5 |
| NI @ r.t. | | | | | |
| .125" | 3.3 | 3.1 | 2.5 | 2.9 | 13.6 |
| .250" | 2.2 | 2.1 | 1.7 | 2.0 | 3.3 |
| Charpy NI .125" | | | | | |
| r.t. | — | — | — | — | 3.9 |
| 0° C. | — | — | — | — | 2.8 |
| −25 | — | — | — | — | 2.8 |
| Tensile Strength Kpsi | | | | | |
| @ Yield | 6.3 | 6.43 | 7.11 | 5.09 | 5.98 |
| Break | 5.0 | 4.14 | 4.46 | 4.29 | 4.69 |
| Tensile Modulus Kpsi | 126 | 126 | 134 | 108 | 114 |
| Elongation % | | | | | |
| @ Yield | 6.7 | 7.2 | 7.2 | 6.9 | 7.8 |
| Break | 93 | 203 | 281 | 64 | 288 |
| 60° Gloss | 24.1 | 76.2 | 89.8 | 52.0 | 52.1 |

[A] poly(1,4-butylene terephthalate), Valox® 315, General Electric Company
[B] poly(etherimide ester) elastomer, Procedure B
[C] (Si/PS)-S/AN, wt. ratio of 70:30, Procedure A The data demonstrate that small amounts of the CSiM of this invention markedly reduce surface gloss in a very desirable way. Impact strengths were improved in all cases, without detrimental effects on surface appearance. Mottling was not seen.

PROCEDURE C

To a siloxane premixture of octamethylcyclotetrasiloxane (D4), 90 parts, tetravinyltetracyclotetrasiloxane (VMD4), 10 parts, tetraethoxysilane (TEOS), 1.7 parts, methacryloxypropyltrimethoxysilane (APTMOS), 1.43 parts, and 0.097 part of an optional platinum complex with chloroplatinic acid containing 35,000 ppm platinum prepared in accordance with U.S. Pat. No. 3,220,972 chloroplatinic acid catalyst solution is added a styrenic mixture composed of styrene(S), 33 parts on base of 100 parts of total D4 and VMD4, divinylbenzene (DVB), 0.67 part, and azobisisobutyronitrile, 0.25 part. The whole organic mixture is stirred into 400 parts of deionized water in which 1.33 parts of dodecylbenzenesulfonic acid is dissolved. The agitated final mixture is then pre-emulsified by passing twice through a homogenizer at a pressure of 4000–8000 psi. The resulting organosiloxane/styrene pre-emulsifion is then heated up to and polymerized at 75°–90° C. for six hours before being quenched by the addition of a neutralizing agent, aqueous $K_2CO_3$.

To the organosiloxane/styrene co-homopolymer is added one stream containing butylacrylate, 35 parts, 1,3-butylene glycol diacrylate, 0.18 part, diallyl maleate, 0.14 part, deionized water, 20.5 parts, and sodium dodecylbenzenesulfonate, 0.875 part, concurrently with another aqueous stream consisting of a water soluble initiator, potassium persulfate, over a period of 1 to 3 hours at 75° C. The butylacrylate/dry silicone-based rubber wt. ratio is sought to be 35:35.

The outer stage comprises polymerized S/AN comonomers at 75:25 wt. ratio, typically, 30 parts to 70 parts of the dry silicone/polystyrene rubber substrate in the latex form. Potassium persulfate, 0.15 part, of deionized water 7.5 parts is mixed in the latex above and held for 15 minutes at 75° C. before 30 parts of a styrene/acrylonitrile S/AN (wt. ratio of 75:25) mixture is continuously added over a period of 1.5 hours and held at the temperature for 3 additional hours. The final solids content is 39%. The isolated product is obtained, as a white grainy powder after flocculation in a hot salt-containing aqueous solution and has a S/AN graft efficiency of 80 percent.

EXAMPLE 5

A dry blend of 80 parts of poly(1,4-butylene terephthalate) (Valox® 315) and 20 parts CSiM modifier ((Si/PS)-BA-S/AN wt. ratio of 35:35:30) prepared by the method of Procedure C is mixed, extruded, pelletized and molded. Notched Izod impact strength at room temperature is 2.7 ft-lbs/in, and there is no mottling or delamination.

COMPARATIVE EXAMPLE 5A*

Poly(1,4-butylene terephthalate) (Valox® 315) alone is extruded, pelletized and molded. Notched Izod impact strength at room temperature is 0.6 ft-lbs/in.

The Examples illustrate that the addition of the co-homopolymerized polyorganosiloxane/polyvinyl-based multi-stage modifier to all blends of polyester resin improves impact performance.

In the foregoing examples, the degree of swelling can be determined in the following fashion:

A prepared polyorganosiloxane/polyvinyl-based latex is coagulated by adding it to about four times its volume of methanol and water (1:1 volume ratio) containing 1 wt. percent $MgSO_4$. The precipitated rubber is washed and vacuum-dried at 70° C. overnight. Approximately 1 g of the dry silicone-based rubber is immersed in 100 ml toluene for 20 to 24 hours at ambient temperature and allowed to swell. The excess toluene is separated by decantation. The swelled polymer is vacuum-dried at 60° C. overnight, and the resulting polymer is weighed. The degree of swelling is calculated as: DS=((weight of swelled polymer) (weight of dry polymer)) divided by (weight of dry polymer).

Graft Efficiency can be determined by weighing dry multi-stage polyorganosiloxane/polyvinyl-based graft polymer in a weighed thimble which is Soxhlet extracted by methyl ethylketone (MEK) for 20 to 22 hr. After vacuum-drying, the residue of MEK extraction is weighed. The graft efficiency is calculated as: GF (%)=((weight of grafted monomer(s))×100) divided by (weight of total monomer(s) polymerized).

All patents and applications mentioned above are hereby incorporated by reference.

Many variations of the present invention will suggest themselves to those skilled in the art in light of the above, detailed description. For example, polybrominated diphenyl ether can be used to make the compositions flame retardant according to this invention. All such obvious variations are within the full intended scope of the appended claims.

We claim:

1. A composition comprising a thermoplastic polyester resin (A); a mixture (A-1) comprising (i) a thermoplastic polyester resin and (ii) a poly(etherester) elastomer, a poly(etherimide ester) elastomer, or a mixture of the foregoing elastomers; or a mixture (A-2) of (A) and (A-1); and an effective impact strength modifying amount of a multi-stage polyorganosiloxane/polyvinyl-based graft polymer composition (B) comprising (a) as a first stage, a substrate selected from
   (i) a polymeric co-homopolymerized substrate comprised of, in combination, an organosiloxane polymer and at least one vinyl-based polymer;
   (ii) a polymeric co-homopolymerized substrate comprised of, in combination, an organosiloxane polymer, at least one vinyl-based polymer, and units which are derived from a cross-linking agent or agents;
   (iii) a polymeric co-homopolymerized substrate comprised of, in combination, an organosioxane polymer, at least one vinyl-based polymer, and units which serve as a graft-linking agent or agents;
   (iv) a polymeric co-homopolymerized substrate comprised of, in combination, an organosiloxane polymer, at least one vinyl-based polymer, units which are derived from a cross-linking agent or agents and units from the same or different agent or agents which serve as a graft-linking agent or agents; or
   (v) a polymeric co-homopolymerized substrate comprised of, in combination, an organosiloxane polymer, at least one vinyl-based polymer, and a mixture of any of units which are derived from a cross-linking agent or agents, units which serve as a graft-linking agent or agents, or units derived from a cross-linking agent or agents and units from the same or different agents or agents which serve as a graft-linking agent or agents; and (b) at least one subsequent stage or stages graft polymerized in the presence of any previous stages and which is comprised of a vinyl-based polymer or a cross-linked vinyl-based polymer.

2. A composition as defined in claim 1, wherein component (A), (A-1) or (A-2) comprises from about 1 to about 99 parts by weight and component (B) comprises from 99 to about 1 part by weight per 100 parts by weight of (A), (A-1) or (A-2) and (B) combined.

3. A composition as defined in claim 1 wherein said thermoplastic polyester resin (i) comprises from about 50 to about 99 parts by weight and said poly(etherester) elastomer, poly(etherimide ester) elastomer or a mixture of the foregoing elastomers (ii) comprises from about 50 to about 1 part by weight per 100 parts by weight of (A-1) or (A-2).

4. A composition as defined in claim 1 wherein said first stage substrate (B)(a) comprises approximately 5 to 95 weight percent of the total graft polymer composition based upon the weight of said first stage substrate and any subsequent graft stage of stages taken together.

5. A composition as defined in claim 4 wherein said first stage substrate (B)(a) comprises approximately 30 to 90 weight percent of the total graft polymer composition (B).

6. A composition as defined in claim 1 wherein said first stage substrate (B) (a) is comprised of approximately 3 to 97 weight percent organosiloxane polymer and correspondingly approximately 97 to 3 weight percent vinyl-based polymer.

7. A composition as defined in claim 6 wherein said first stage substrate (B) (a) is comprised of approximately 5 to 45 weight percent vinyl-based polymer.

8. A composition as defined in claim 1 wherein said organosiloxane polymer is comprised primarily of a mixture of units of the formula

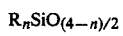

wherein R is hydrogen or a monovalent hydrocarbon radical of about 1 to 16 carbon atoms and n is 0, 1 or 2.

9. A composition as defined in claim 1 wherein the vinyl-based polymer component of said first stage substrate (B)(a) is comprised primarily of polymerized alkenyl aromatic units, (meth)acrylate units or a mixture thereof.

10. A composition as defined in claim 9 wherein said vinyl-based polymer component comprises polystyrene.

11. A composition as defined in claim 9 wherein in addition to alkenyl aromatic units, said vinyl-based polymer component also includes divinylbenzene units.

12. A composition as defined in claim 1 wherein said vinyl-based polymer in any subsequent stage (B)(b) includes monomers selected from the group consisting of alkenyl aromatic compounds, (meth)acrylate compounds, vinyl cyanide compounds, maleimide compounds, acrylamide compounds or mixtures of any of the foregoing.

13. A composition as defined in claim 12 wherein said vinyl-based polymer is selected from the group consisting of polystyrene, styrene/acrylonitrile copolymer, styrene/divinylbenzene copolymer, styrene/acrylonitrile/divinylbenzene terpolymer and poly(butyl)acrylate.

14. A composition as defined in claim 1 wherein in component (B) said subsequent stages comprise
(b)(i) a second stage comprising at least one polymer and optionally units derived from a cross-linking agent or agents, units which serve as a graft-linking agent or agents, units derived from a cross-linking agent or agents and units from the same or different agent or agents which serve as a graft-linking agent or agents, or a mixture of any of the foregoing; and
(b)(ii) a third stage comprising at least one vinyl-based polymer or cross-linked vinyl-based polymer which is the same as, or different than, said (b)(i) polymer.

15. A composition as defined in claim 14 wherein the ratio of first stage substrate polymer (B)(a) to second stage polymer (b)(i) is 10:90 to 90:10 by weight based upon 100 parts by weight of (B)(a) and (b)(i) combined and the amount of third stage polymer (b)(ii) comprises from about 10 to about 90 parts by weight per 100 parts by weight of (a), (b)(i), and (b)(ii) combined.

16. A composition as defined in claim 14 wherein subsequent stage (b)(i) comprises a cross-linked butyl acrylate polymer and subsequent stage (b)(ii) comprises a styrene/acrylonitrile copolymer.

17. A composition as defined in claim 1 wherein said thermoplastic polyester resin is prepared by reacting an aromatic dicarboxylic acid of 8 to 22 carbon atoms and an alkylene glycol, a cycloaliphatic glycol, an aralkylene glycol of 2 to 22 carbon atoms or any mixture of any of the foregoing.

18. A composition as defined in claim 14 wherein said thermoplastic polyester resin is prepared by reacting an aromatic dicarboxylic acid of 8 to 22 carbon atoms and an alkylene glycol, a cycloaliphatic glycol, an aralkylene glycol of 2 to 22 carbon atoms or any mixture of any of the foregoing.

19. A composition as defined in claim 17 wherein said thermoplastic polyester resin comprises poly(1,4-butylene terephthalate).

20. A composition as defined in claim 18 wherein said thermoplastic polyester resin comprises poly(1,4-butylene terephthalate).

21. A composition as defined in claim 1 wherein said elastomer (ii) is a block copolymer comprising (1) poly(1,4-butylene-terephthalate) segments and (2) poly(butylene ether glycol) alone or in combination with an aliphatic polyester, segments.

22. A composition as defined in claim 14 wherein said elastomer (ii) is a block copolymer comprising (1) poly(1,4-butylene terephthalate) segments and (2) poly(butylene ether glycol) alone or in combination with an aliphatic polyester, segments.

23. A composition as defined in claim 1 wherein said elastomer (ii) is a block copolymer comprising (1) polyester segments and (2) poly(etherimide) segments.

24. A composition as defined in claim 14 wherein said elastomer (ii) is a block copolymer comprising (1) polyester segments and (2) poly(etherimide) segments.

25. A composition as defined in claim 1 which also includes
(C) an effective amount of a flame retardant agent.

26. A composition as defined in claim 1 which also includes
(D) an effective amount of reinforcing filler.

27. A composition as defined in claim 1 which also includes
(C) an effective amount of a flame retardant agent; and
(D) an effective amount of a reinforcing filler.

28. A composition as defined in claim 14 which also includes
(C) an effective amount of a flame retardant agent.

29. A composition as defined in claim 14 which also includes
(D) an effective amount of reinforcing filler.

30. A composition as defined in claim 14 which also includes
(C) an effective amount of a flame retardant agent; and
(D) an effective amount of a reinforcing filter.

31. An article molded from a resin composition as defined in claim 1.

32. An article extruded from a resin composition as defined in claim 1.

33. An article thermoformed from a resin composition as defined in claim 1.

34. An article molded from a resin composition as defined in claim 14.

35. An article extruded from a resin composition as defined in claim 14.

36. An article thermoformed from a resin composition as defined in claim 14.

* * * * *